United States Patent
Shi et al.

(10) Patent No.: US 10,044,162 B2
(45) Date of Patent: Aug. 7, 2018

(54) HIGH ENERGY NANOSECOND PULSED FIBER LASER BASED ON INCOHERENT BEAM COMBINATION

(71) Applicant: HFB Photonics co., Ltd., Weihai (CN)

(72) Inventors: Wei Shi, Weihai (CN); Qiang Fang, Weihai (CN); Liang Qi, Weihai (CN)

(73) Assignee: HFB Photonics co., Ltd., Weihai (CN)

( * ) Notice: Subject to any disclaimer, the term of this patent is extended or adjusted under 35 U.S.C. 154(b) by 0 days.

(21) Appl. No.: 15/683,753

(22) Filed: Aug. 22, 2017

(65) Prior Publication Data

US 2018/0102621 A1    Apr. 12, 2018

(30) Foreign Application Priority Data

Oct. 8, 2016 (CN) .......................... 2016 1 0871205

(51) Int. Cl.
| | |
|---|---|
| *H01S 3/06* | (2006.01) |
| *H01S 3/067* | (2006.01) |
| *H01S 3/10* | (2006.01) |
| *H01S 3/102* | (2006.01) |
| *H01S 3/115* | (2006.01) |

(52) U.S. Cl.
CPC ............ *H01S 3/067* (2013.01); *H01S 3/1024* (2013.01); *H01S 3/10046* (2013.01); *H01S 3/115* (2013.01)

(58) Field of Classification Search
CPC ...... H01S 3/005; H01S 3/0064; H01S 3/0675; H01S 3/091; H01S 3/092; H01S 3/094003; H01S 3/11; H01S 3/067; H01S 3/10046; H01S 3/115
See application file for complete search history.

(56) References Cited

U.S. PATENT DOCUMENTS

| | | | | |
|---|---|---|---|---|
| 5,694,408 | A * | 12/1997 | Bott ...................... | H01S 3/2383 372/108 |
| 6,567,605 | B1 * | 5/2003 | Rice ..................... | H04N 9/3129 348/E9.026 |
| 2011/0304853 | A1 * | 12/2011 | Yamada ................ | H01S 5/0656 356/479 |

* cited by examiner

*Primary Examiner* — Armando Rodriguez
(74) *Attorney, Agent, or Firm* — Wayne & King LLC

(57) ABSTRACT

An incoherent beam combination based high energy nanosecond pulsed fiber laser includes a nanosecond pulsed seed, a fiber splitter, fiber amplifiers, synchronization fibers, a fiber laser combiner and a laser output head. The output fiber of the pulsed seed is fusion spliced to the input fiber of the splitter; the output fibers of the splitter are fusion spliced to the fiber amplifiers separately; synchronization fibers are fusion spliced between the amplifiers and the input fibers of the fiber laser combiner. The nanosecond pulsed seed is split by the fiber splitter and amplified in the later fiber amplifiers; synchronization fibers make sure the optical time-domain synchronization; the fiber laser combiner allows for the incoherent combination of high energy pulsed laser.

10 Claims, 4 Drawing Sheets

HIGH ENERGY NANOSECOND PULSED FIBER LASER BASED ON INCOHERENT BEAM COMBINATION

CROSS-REFERENCE TO RELATED APPLICATIONS

This application claims priority to Chinese Patent Application No. 201610871205.6 with a filing date of Oct. 8, 2016. The content of the aforementioned applications, including any intervening amendments thereto, are incorporated herein by reference.

TECHNICAL FIELD

The present invention relates to the construction of compact source of high energy nanosecond laser pulses.

BACKGROUND OF THE PRESENT INVENTION

Fiber lasers and amplifiers are lasers and amplifiers whose gain mediums are rare-earth doped fibers. The different rare-earth elements, such as erbium, neodymium, ytterbium and thulium, can provide a wide range of laser wavelength, from ultraviolet to mid-infrared. By comparison, fiber lasers and amplifiers have several advantages, among them being high efficiency, high beam quality, compact structure, good thermal management, long lifetime, maintain-free operation et al. Owing to that, the fiber lasers and amplifiers have a significant development in application and rapid growth in the market.

In recent years, high power nanosecond pulsed all fiber lasers have been widely used in the field of marking and carving in which the output power is several tens watts and the pulse energy is several millijoules. But in the application of laser cleaning, an average power of several hundreds watts with a pulse energy of more than fifty millijoules is needed.

This invention puts forward an incoherent beam combination based nanosecond pulsed fiber laser by using a nanosecond pulsed seed, a fiber splitter, fiber amplifiers, synchronization fibers, a fiber laser combiner and a laser output head to realize the output of high power high energy nanosecond pulsed laser.

SUMMARY OF PRESENT INVENTION

To solve the above problem, the purpose of the present invention is to provide a high power high energy nanosecond pulsed fiber laser with a compact structure and novel combination.

The present invention provides an incoherent beam combination based high energy nanosecond pulsed fiber laser, including a nanosecond pulsed seed, a fiber splitter, fiber amplifiers, synchronization fibers, a fiber laser combiner and a laser output head. The output fiber of the pulsed seed is fusion spliced to the input fiber of the splitter; the output fibers of the splitter are fusion spliced to the fiber amplifiers separately; synchronization fibers are fusion spliced between the amplifiers and the input fibers of the fiber laser combiner. The nanosecond pulsed seed is split by the fiber splitter and amplified in the later fiber amplifiers; synchronization fibers make sure the optical time-domain synchronization; the fiber laser combiner allows for the incoherent combination of high energy pulsed laser.

The incoherent beam combination based high energy nanosecond pulsed fiber laser is described above. It is characterized in that the nanosecond pulsed seed could be a actively Q-switch fiber laser, including a pump diode, a signal pump fiber combiner, double cladding Yb+ doped fiber, high-reflection(HR) fiber grating, fiber coupled acousto-optic modulator(AOM), partial-reflection(PR) fiber grating and fiber optic isolator. The pump diode is fusion spliced with the pump fiber of the combiner. The signal fiber of the combiner is cleaved with 8° angle. The output fiber of the combiner is fusion spliced with HR grating. The other port fiber of the HR grating is fusion spliced with the double cladding Yb+ doped fiber. The AOM is fusion spliced between the double cladding Yb+ doped fiber and PR grating. The input fiber of the isolator is fusion spliced with the PR grating. The output fiber of the isolator acts as the output of the nanosecond pulsed seed.

The incoherent beam combination based high energy nanosecond pulsed fiber laser is described above. It is characterized in that the nanosecond pulsed seed could be electric current modulated diode laser including pulsed electric current driver, fiber coupled electric current modulated diode and a fiber optic isolator. The diode laser is modulated by the driver and outputs pulsed laser with a repetition rate from thousands hertz to hundreds hertz and a pulse width from tens nanosecond to hundreds nanosecond. The input fiber of the isolator is fusion spliced with the diode laser and the output fiber acts as the output fiber of the nanosecond pulsed seed.

The incoherent beam combination based high energy nanosecond pulsed fiber laser is described above. It is characterized in that the nanosecond pulsed seed could be fiber coupled gain-switched semiconductor laser or other lasers which could supply nanosecond pulsed seed.

The incoherent beam combination based high energy nanosecond pulsed fiber laser is described above. It is characterized in that the fiber amplifier comprises fiber amplifier stages which are forward pumped or backward pumped. The amplifier stage includes a signal pump combiner, a diode pump laser, double cladding Yb+ doped fiber and a fiber optic isolator. The output fiber of the diode pump laser is fusion spliced with the pump fiber of the signal pump combiner. The output fiber of the signal pump combiner is fusion spliced with the double cladding Yb+ doped fiber. The other end of the double cladding Yb+ doped fiber is fusion spliced with the fiber optic isolator.

The incoherent beam combination based high energy nanosecond pulsed fiber laser is described above. It is characterized in that the fiber amplifiers have more than two amplified stages which are used to get higher power and higher energy. The output fiber of the former amplified stage is fusion spliced with the signal fiber of later stage. The signal fibers of the first amplified stages are fusion spliced with the output fibers of the fiber splitter. The output fibers of the last amplified stages are fusion spliced with the synchronization fibers.

The incoherent beam combination based high energy nanosecond pulsed fiber laser is described above. It is characterized in that the synchronization fibers are passive fiber. The time-domain synchronization is achieved by changing the length of the synchronization fibers.

The incoherent beam combination based high energy nanosecond pulsed fiber laser is described above. It is characterized in that the fiber splitter is utilized, which could be one single splitter or multi-splitter. For example, when the nanosecond pulsed seed needs to be split into 7 branches, one 1*7 splitter or two 1*4 splitters, both methods are adoptable.

The incoherent beam combination based high energy nanosecond pulsed fiber laser is described above. It is characterized in that an N*1 laser combiner is utilized, which can combine N branches laser into one output fiber.

The incoherent beam combination based high energy nanosecond pulsed fiber laser is described above. It is characterized in that the output head is cylindrical quartz, whose end face has a 8° and wavelength-depended high transparency layer.

The advantage of this invention is it provides a high energy high power nanosecond pulsed fiber laser with simple devices, a compact structure and novel combination.

DETAILED DESCRIPTION OF PREFERRED EMBODIMENTS

The incoherent beam combination based nanosecond pulsed fiber laser provided by the present invention will be described as below in details in connection with the accompanying drawings by specific embodiments.

Figure 1:
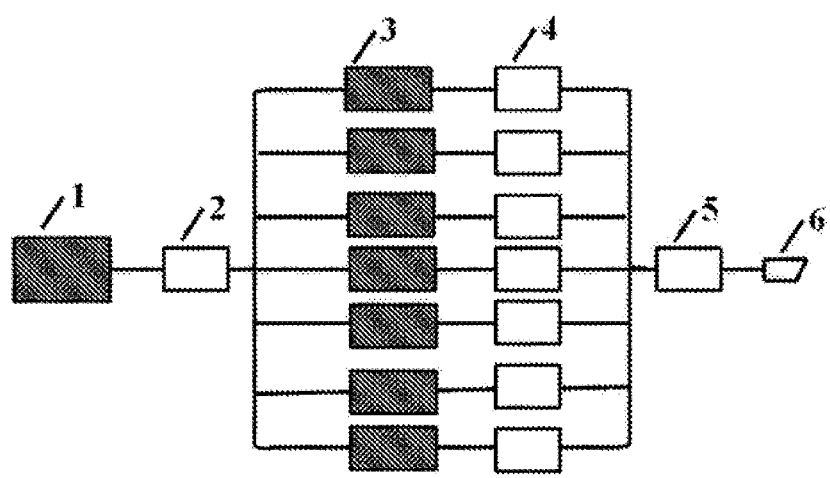
FIG. 1 illustrates an embodiment of the incoherent beam combination based nanosecond pulsed fiber laser according the present invention, wherein: 1: nanosecond pulsed seed; 2: fiber splitter; 3: fiber amplifiers; 4: synchronization fibers; 5: fiber laser combiner; 6: laser output head.

As shown in FIG. 1, the incoherent beam combination based nanosecond pulsed fiber laser provided by the present invention includes, a nanosecond pulsed seed 1, a 1*7 fiber splitter 2, fiber amplifiers 3, synchronization fibers 4, a 7*1 fiber laser combiner 5 and a laser output head 6, wherein the laser from nanosecond pulsed seed 1 is split by the fiber splitter 2 and amplified in the later fiber amplifiers 3; synchronization fibers 4 make sure the optical time-domain synchronization; the fiber laser combiner 5 allows for the incoherent combination of high energy pulsed laser; the laser output head 6 is fusion spliced with the output fiber of the fiber laser combiner for spatial output.

Figure 2:
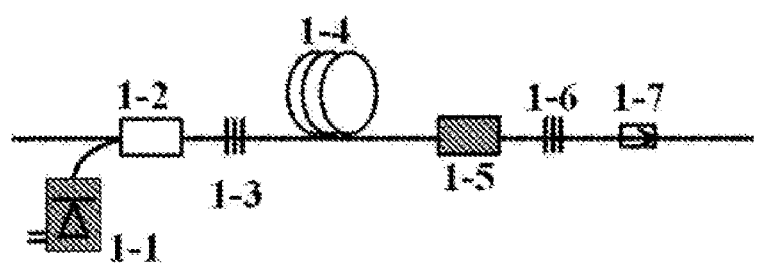
FIG. 2 illustrates one embodiment of the nanosecond pulsed seed according to the present invention, wherein: 1-1: pump diode; 1-2: signal pump fiber combiner: 1-3: high-reflection fiber grating; 1-4: double cladding Yb+ doped fiber; 1-5: fiber coupled acousto-optic modulator; 1-6: partial-reflection fiber grating; 1-7: fiber optic isolator.

FIG. 2 illustrates one embodiment of the nanosecond pulsed seed according to the present invention includes, a pump diode 1-1, a signal pump fiber combiner 1-2, double cladding Yb+ doped fiber 1-4, high-reflection(HR) fiber grating 1-3, fiber coupled acousto-optic modulator(AOM) 1-5, partial-reflection(PR) fiber grating 1-6 and fiber optic isolator 1-7. The pump diode 1-1 is fusion spliced with the pump fiber of the combiner 1-2. The signal fiber of the combiner 1-2 is cleaved with 8° angle. The output fiber of the combiner 1-2 is fusion spliced with HR grating 1-3. The other port fiber of the HR grating 1-3 is fusion spliced with the double cladding Yb+ doped fiber 1-4. The AOM 1-5 is fusion spliced between the double cladding Yb+ doped fiber 1-4 and PR grating 1-6. The input fiber of the isolator 1-7 is fusion spliced with the PR grating 1-6. The output fiber of the isolator 1-7 acts as the output of the nanosecond pulsed seed 1. This structure could realize a laser output with a repetition rate from thousands hertz to hundreds hertz and a pulse width from tens nanosecond to hundreds nanosecond.

Figure 3:
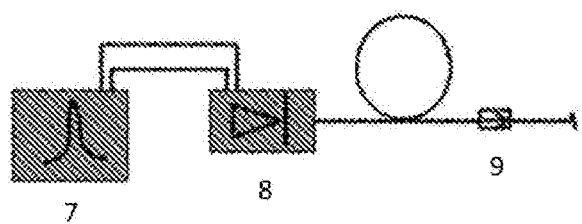
FIG. 3 illustrates another embodiment of the nanosecond pulsed seed according to the present invention, wherein: 7: pulsed electric current driver; 8: fiber coupled electric current modulated diode; 9: fiber optic isolator.

FIG. 3 illustrates another embodiment of the nanosecond pulsed seed according to the present invention includes, pulsed electric current driver 7, fiber coupled electric current modulated diode 8 and a fiber optic isolator 9. The fiber coupled electric current modulated diode 8 is modulated by the driver 7 and outputs pulsed laser with a repetition rate from thousands hertz to hundreds hertz and a pulse width from tens nanosecond to hundreds nanosecond. The input fiber of the isolator 9 is fusion spliced with the diode 8 and the output fiber acts as the output fiber of the nanosecond pulsed seed 1.

Figure 4:
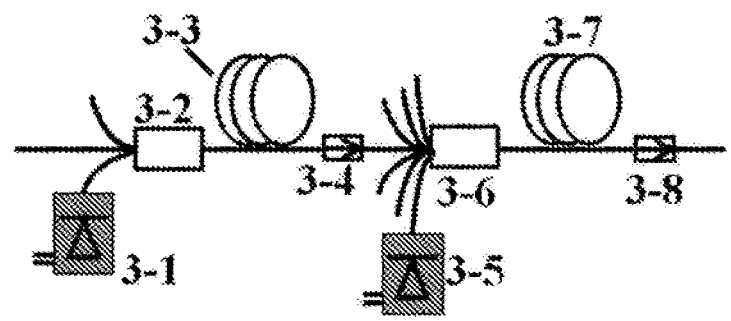
FIG. 4 illustrates an embodiment of the fiber amplifier according to the present invention, wherein: 3-1: pump diode; 3-2: signal pump fiber combiner; 3-3: double cladding Yb+ doped fiber; 3-4: fiber optic isolator; 3-5: pump diode; 3-6: signal pump fiber combiner; 3-7: double cladding Yb+ doped fiber; 3-8: fiber optic isolator.

FIG. 4 illustrates an embodiment of the fiber amplifier according to the present invention includes two amplified stages which both are forward pumped, wherein the first amplified stage includes the pump diode 3-1, the signal pump fiber combiner 3-2, the double cladding Yb+ doped fiber 3-3 and the fiber optic isolator 3-4, the second amplified stage includes the pump diode 3-5, the signal pump fiber combiner 3-6, the double cladding Yb+ doped fiber 3-7 and the fiber optic isolator 3-8.

We claim:

1. An incoherent beam combination based nanosecond pulsed fiber laser, comprising: a nanosecond pulsed seed, a fiber splitter, fiber amplifiers, synchronization fibers, a fiber laser combiner and a laser output head; wherein an output fiber of the pulsed seed is fusion spliced to the input fiber of the splitter; output fibers of the splitter are fusion spliced to the fiber amplifiers separately; synchronization fibers are fusion spliced between the amplifiers and an input fibers of the fiber laser combiner; the nanosecond pulsed seed is split by the fiber splitter and amplified in the later fiber amplifiers; synchronization fibers are configured for optical time-domain synchronization; and the fiber laser combiner allows the incoherent combination of high energy pulsed laser.

2. The fiber laser of claim 1, wherein said nanosecond pulsed seed is an actively Q-switch fiber laser, including a pump diode, a signal pump fiber combiner, double cladding $Yb^+$ doped fiber, high-reflection (HR) fiber grating, fiber coupled acousto-optic modulator (AOM), partial-reflection (PR) fiber grating and fiber optic isolator, the pump diode is fusion spliced with the pump fiber of the combiner; a signal fiber of the combiner is cleaved with an 8° angle; an output fiber of the combiner is fusion spliced with the HR fiber grating; a port fiber of the HR fiber grating is fusion spliced with the double cladding $Yb^+$ doped fiber; the AOM is fusion spliced between the double cladding $Yb^+$ doped fiber and the PR fiber grating; an input fiber of the isolator is fusion spliced with the PR fiber grating; and an output fiber of the isolator acts as the output of the nanosecond pulsed seed.

3. The fiber laser of claim 1, wherein the nanosecond pulsed seed is an electric current modulated diode laser including pulsed electric current driver, fiber coupled electric current modulated diode and a fiber optic isolator; the diode laser is modulated by the driver and outputs pulsed laser with a repetition rate from thousands hertz to hundreds hertz and a pulse width from tens nanosecond to hundreds nanosecond; the input fiber of the isolator is fusion spliced with the diode laser and the output fiber acts as the output fiber of the nanosecond pulsed seed.

4. The fiber laser of claim 1, wherein the nanosecond pulsed seed is a fiber coupled gain-switched semiconductor laser or other lasers which could supply nanosecond pulsed seed.

5. The fiber laser of claim 1, wherein the fiber amplifier comprises fiber amplifier stages which are forward pumped or backward pumped; the amplifier stage includes a signal pump combiner, a diode pump laser, double cladding $Yb^+$ doped fiber and a fiber optic isolator; the output fiber of the diode pump laser is fusion spliced with the pump fiber of the signal pump combiner; the output fiber of the signal pump combiner is fusion spliced with the double cladding $Yb^+$ doped fiber; and the other end of the double cladding $Yb^+$ doped fiber is fusion spliced with the fiber optic isolator.

6. The fiber laser of claim 1, wherein the fiber amplifiers have more than two amplified stages which are used to get higher power and higher energy; the output fiber of the former amplified stage is fusion spliced with the signal fiber of later stage; the signal fibers of the first amplified stages are fusion spliced with the output fibers of the fiber splitter; and the output fibers of last amplified stages are fusion spliced with the synchronization fibers.

7. The fiber laser of claim 1, wherein the synchronization fibers are passive fiber; the time-domain synchronization is achieved by changing the length of the synchronization fibers.

8. The fiber laser of claim 1, wherein the fiber splitter is one single splitter or multi-splitter.

9. The fiber laser of claim 1, wherein the laser combiner are capable of combining N branches laser into one output fiber.

10. The fiber laser of claim 1, wherein the output head is cylindrical quartz, whose end face has an 8° and a wavelength-depended high transparency layer.

* * * * *